(12) United States Patent
Ben-Dayan et al.

(10) Patent No.: US 8,686,852 B2
(45) Date of Patent: Apr. 1, 2014

(54) LOCATION-BASED NOTIFICATION SERVICES

(75) Inventors: Adi Ben-Dayan, Rishon Lezion (IL); Gilad Oren, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 13/118,481

(22) Filed: May 30, 2011

(65) Prior Publication Data

US 2012/0306659 A1 Dec. 6, 2012

(51) Int. Cl.
*G08B 1/08* (2006.01)
(52) U.S. Cl.
USPC .................. 340/539.13; 340/8.1; 455/456.3
(58) Field of Classification Search
USPC ............... 455/456.1–456.3, 457; 340/539.13, 340/573.4, 8.1, 988; 701/517
See application file for complete search history.

(56) References Cited

U.S. PATENT DOCUMENTS

| 7,237,201 | B2 | 6/2007 | Fish | |
|---|---|---|---|---|
| 7,394,405 | B2 | 7/2008 | Godden | |
| 2003/0233210 | A1 | 12/2003 | Liberti et al. | |
| 2007/0191025 | A1* | 8/2007 | McBrierty et al. | 455/456.2 |
| 2007/0243880 | A1* | 10/2007 | Gits et al. | 455/456.1 |
| 2008/0032703 | A1 | 2/2008 | Krumm et al. | |
| 2010/0093371 | A1 | 4/2010 | Gehrke et al. | |
| 2013/0130715 | A1* | 5/2013 | Haney | 455/456.1 |

OTHER PUBLICATIONS

Campbell, Steven, "Finding Your Friends via GPS with these 9 Free Mobile Apps" Retrieved at <<http://www.makeuseof.com/tag/finding-your-friends-via-gps-9-free-mobile-apps/>>, May 10, 2010.
"Locate your friends in real time with Google Latitude", Retrieved at <<http://googlemobile.blogspot.com/2009/02/locate-your-friends-in-real-time-with.html>>, Feb. 4, 2009.
"The Ethics of Locating Someone by Mobile Phone", Retrieved at <<http://www.brighthub.com/mobile/emerging-platforms/articles/109107.aspx>>, Retrieved Date: Mar. 24, 2011.

* cited by examiner

*Primary Examiner* — Thomas Mullen
(74) *Attorney, Agent, or Firm* — Steve Spellman; Jim Ross; Micky Minhas (57) ABSTRACT

Architecture that generates a notification when a user arrives at a location, but without exposing identity of the location. Moreover, the notification can be generated and transmitted at all times. The architecture comprises a reminder service that manages all reminder requests and approvals, a notification engine that notifies a requesting user when target user arrived at a specific location or one of a general category of location, and a user interface that allows the user to set reminders that are displayed when the target user arrives at the point of interest and approves other user reminder requests. The architecture can be run on a mobile phone, and manages user requests and user approvals for location based notifications, alerts a requesting user the target user arrived at one of previously-specified points of interest. Similarly, a general category of destination can be specified, rather than a specific point of interest.

20 Claims, 7 Drawing Sheets

LOCATION-BASED NOTIFICATION SERVICES

BACKGROUND

There are numerous cases when people want to know when children, employees, friends, vehicles (e.g., buses, trains, cars, etc.), etc., arrive or depart or just linger at a specific location, and also want to be notified immediately when the arrival, departure, or lingering event occurs. However, in all other cases, the location could remain private. For example, parents want to know if a child left the school perimeter in the middle of the day (e.g., during workdays only), a parent wants to know if a son is driving on the highway on a rainy night, or a teenager wants to know when a friend arrives at any mall during weekends.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture can generate a notification when a user arrives at, lingers in, or departs from a location—with or without exposing the location information. Exposure of the location information can be managed according to permissions or privileges. Moreover, the notification can be generated and transmitted at any and all times.

The architecture provides the capability to run on a mobile phone (e.g., with geo-location capabilities), and manages user requests and user approvals for location based notifications, alerts a requesting user (e.g., via a mobile phone, desktop computer, a portable computer, and/or other suitable device) that target user arrived at one of previously-specified points of interest. Similarly, a general category or class of location can be specified, such as "malls in the city of Seattle" (the point of interest does not need to be specific but can be a member of the class).

The architecture can comprise a reminder service that manages all reminder requests and approvals (for privacy issues), a notification engine that notifies a requesting user when target user arrived at a specific location or one of a general category of location, and a user interface that allows the user to set reminders that are displayed when the target user arrives at the destination and approves other user reminder requests.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture includes a notification system that sends one or more notifications and reminders to requesting users based on geographic location of a target user relative to one or more points of interest (geographical locations). The system and methods can run on computing devices such as mobile phones, portable computers, desktop computers, and so on, and can utilize online services.

Generally, the architecture can include a reminders component (e.g., a service) that provides user interfaces (UIs) which enable the creation and configuration of reminder requests and approvals, and a notification component that communicates one or more notifications when the target user reaches, enters, and/or exits the specified point of interest and maintains fresh data about the points of interest that satisfies refreshable queries.

The UIs enable the user to set reminders that are displayed when the target user meets the geo-location criteria for the location (and any other defined filters such as time, date, speed, weather, prior locations visited, etc.), and approve other user reminder requests.

The disclosed architecture can be employed for a wide variety of purposes that include ensuring the safety of children and adults, identifying geo-location for taxation purposes (e.g., mileage), identifying geo-location for job performance (e.g., electronic time card for arrival at a construction site), identifying geo-location information of property movement and utilization, and so on.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
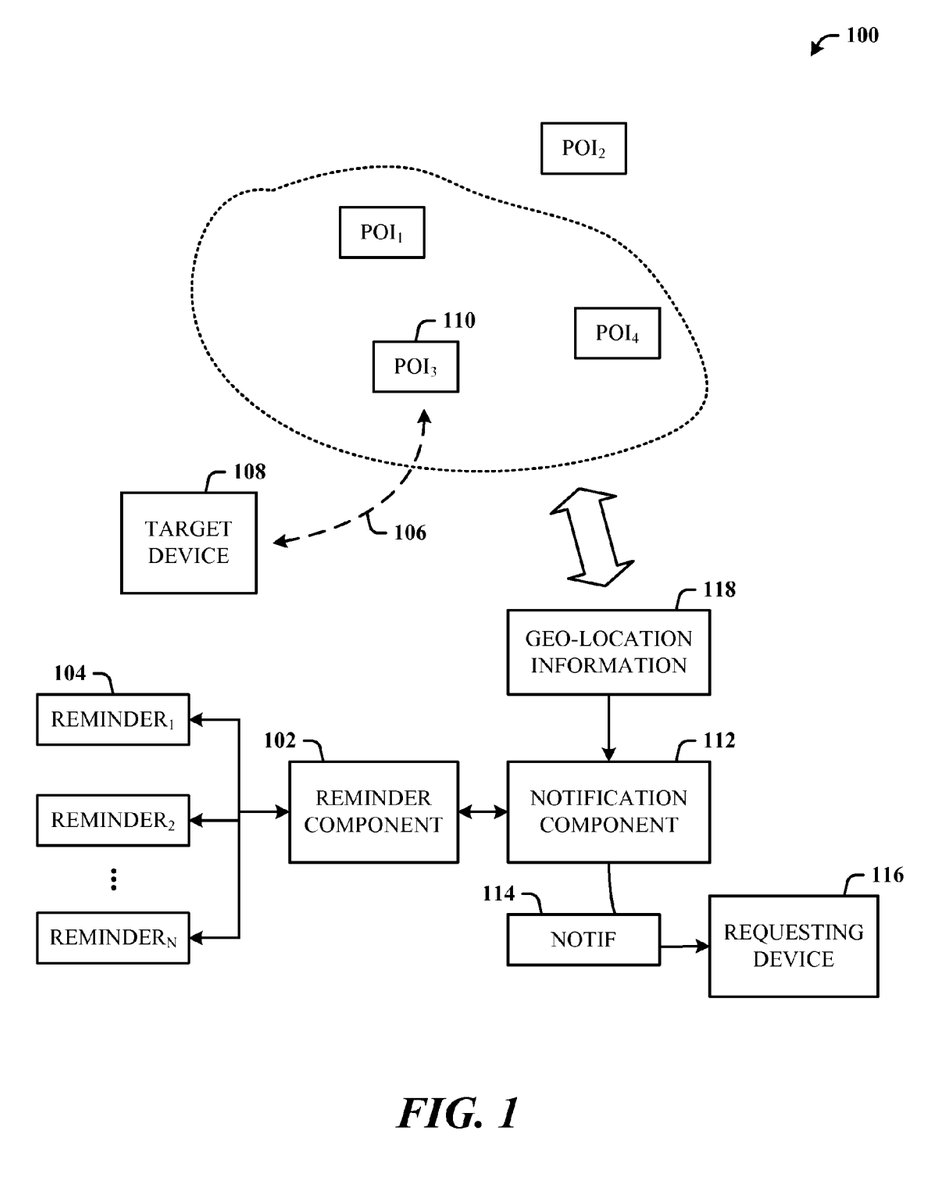
FIG. 1 illustrates a notification system in accordance with the disclosed architecture.

FIG. 1 illustrates a notification system 100 in accordance with the disclosed architecture. The system 100 can include a reminder component 102 that manages configuration and approval of a reminder 104 related to (via a geographical relationship 106) the geographic location of a target device 108 relative to a point of interest (POI) 110. The relationship 106 between the target device 108 and the point of interest 110 can be defined according to proximity of the target device 108 to the point of interest 110, if the target device 108 is detected to have entered the point of interest 110, if the target device 108 has exited the point of interest 110, and/or lingered (dwell time) at the point of interest 110, for example.

A notification component 112 of the system 100 monitors the geographical location of the target device 108 and communicates a notification 114 (denoted NOTIF) to a requesting device 116 according to the reminder 104 when the geographic location of the target device 108 meets geo-location criteria (e.g., near, in, or exiting) related to the point of interest 110. Although showing only a single requesting device 116, it is within contemplation of the disclosed architecture that there can be multiple requesting devices, as is described herein below.

The target device 108 can be a mobile device (e.g., a cellphone) the geographical location of which is monitored, and the requesting device 116 can be a mobile device (e.g., a cellphone) to which the notification 114 is communicated. Alternatively, the target device can be a mobile phone and the requesting devices can include one or more of a computing device (e.g., portable computer, desktop computer, tablet computer, etc.), a web server, a mobile phone, etc. The point of interest 110 can be a single geographic location specified in association with the reminder 104.

The point of interest 110 can be one of a class of locations (e.g., all restaurants, all shopping malls in a five mile radius, etc.) specified in association with the reminder 104 and the notification 114 is communicated when the target device 108 meets the geo-location criteria for one location (e.g., POI 110) of the class. In other words, a query provided to the system 100 can be "all shopping malls". Thus, when the target device 108 (as carried by a user) enters any shopping mall, such as the point of interest 110, the notification 114 and reminder 104 are triggered for communication to all intended and approved requesting devices (e.g., requesting device 116).

In this embodiment, the notification component 112 can receive geo-location information 118 that determines the geographical relationship 106 between the target device 108 and the point of interest 110. The geo-location information 118 can be obtained from a technology that identifies location of an entity, such as global positioning system (GPS), triangulation, access points, and other techniques used to ascertain the geographical location of the entity (e.g., cell phone).

Geo-fencing technology can be employed to determine the proximity relative to a point of interest. A geo-fence is a predefined virtual perimeter (e.g., within a two mile radius) relative to a physical geographic area. When the geo-location of the target device 108 matches the geo-location information that defines the virtual perimeter (denoted by the dotted line object surrounding the POI 110 and other POIs), specified events can be triggered to occur, such as sending the notification 114 to the requesting device 116.

Figure 2:
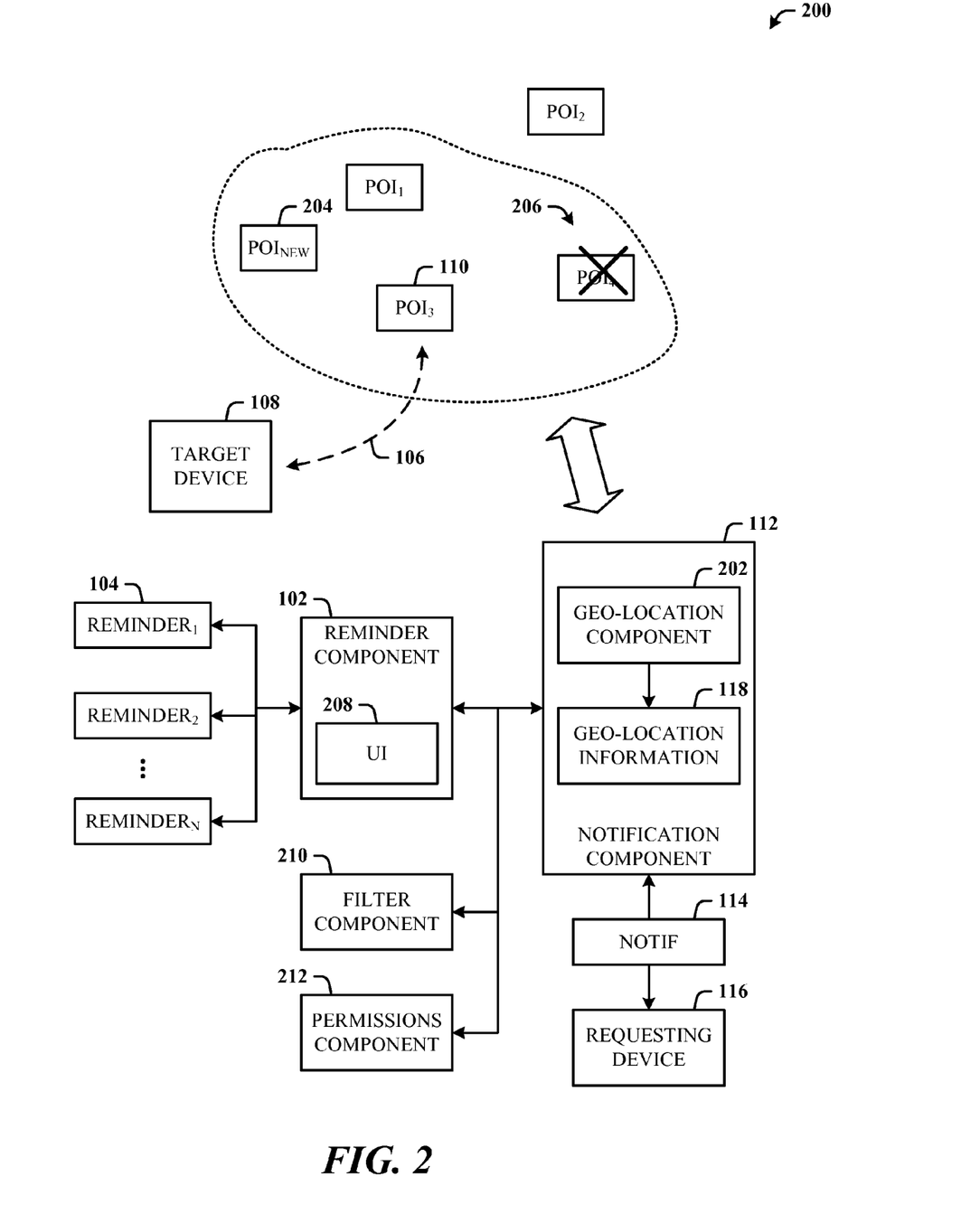
FIG. 2 illustrates a more detailed embodiment of a notification system in accordance with the disclosed architecture.

FIG. 2 illustrates a more detailed embodiment of a notification system 200 in accordance with the disclosed architecture. In this implementation, the notification component 112 can include a geo-location component 202 that identifies geo-location points of interest (e.g., POI 110) relative to a query (e.g., all shopping malls). The query can be refreshed to include added points of interest (e.g., POI 204) and removed points of interest (e.g., POI 206) associated with a geo-fence. The reminder 104 is then processed based on the refreshed query.

The reminder component 102 can include a user interface (UI) 208 that facilitates creation of the reminder 104 (and other reminders), approval of the reminder 104 from the requesting device 116, and an action associated with the reminder 104. In other words, the UI 208 can be included as part of the client user interface of the target device 108, or any suitable client device (e.g., desktop computer). Alternatively, or in combination therewith, the capabilities of the UI 208 can be made accessible via a web service to the target device 108. For example, a user may log into the web service to access the functionality to create and/or approve the reminder 104. Likewise, the requesting device 116 can access the web service (via the UI 208) to create the reminder 104 and define associated actions. It is to be understood that the reminder component 102 can include additional functionality, including, but not limited to, performing actions related to the notification component 112, as well as accessing the geo-location information 118. In an alternative embodiment, the notification component 112 can be part of the reminder component 102 such that the geo-location information 118 is received into the reminder component 102.

The system 200 can further comprise a filter component 210 that applies a filter parameter to the geo-location criteria. The notification 114 is communicated to the requesting device 116 based on the filter parameter.

The system 200 can further comprise a permissions component 212 that processes a request by the requesting device 116 to access identification of location of the target device 108 and an approval of the target device 108 to allow geolocation identification by the requesting device 116.

Figure 3:
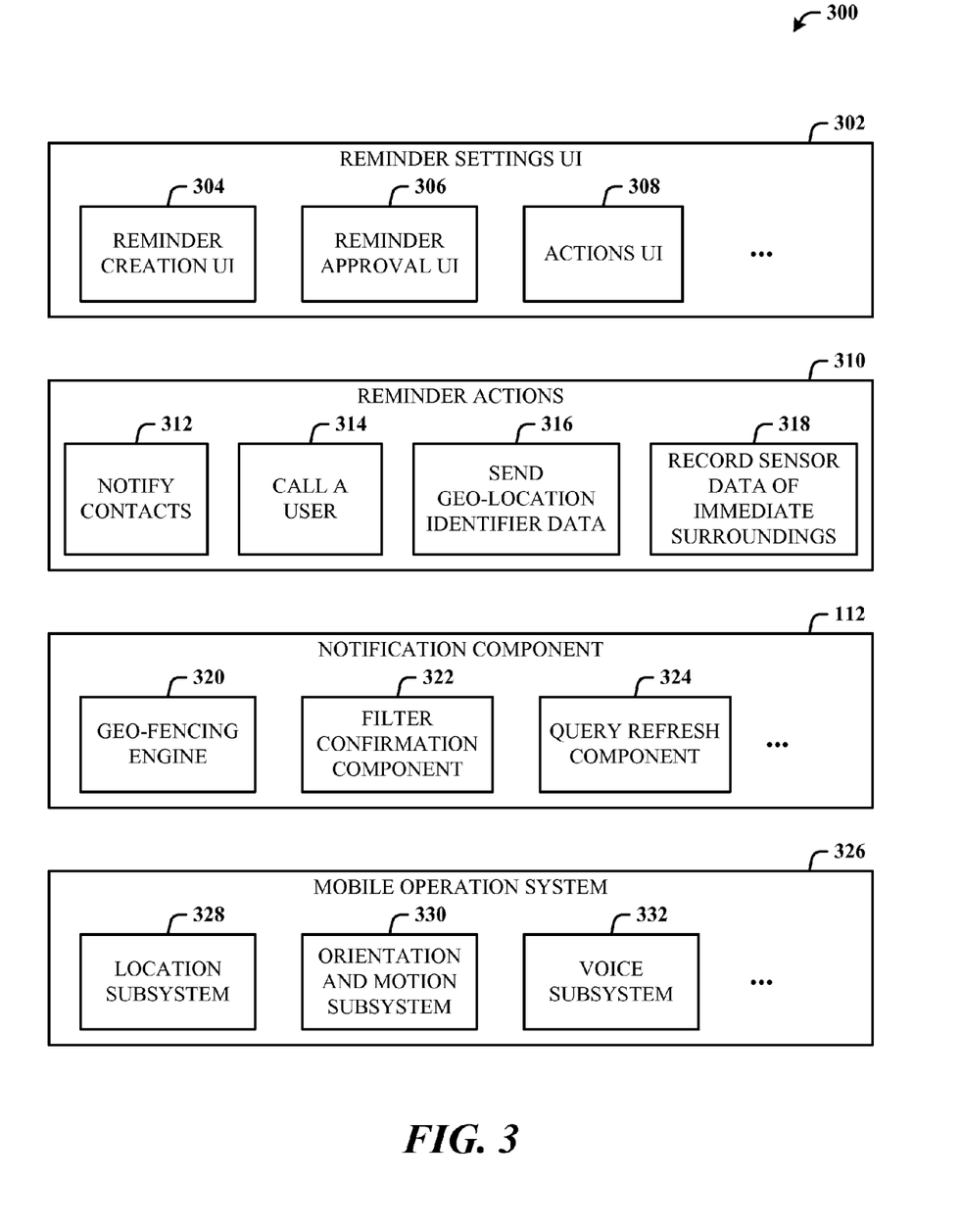
FIG. 3 illustrates a system that includes components and entities for reminder management, notification management, geo-location processes, and client operations.

FIG. 3 illustrates a system 300 that includes components and entities for reminder management, notification management, geo-location processes, and client operations. The system 300 comprises a reminder component (e.g., service) that manages all reminder requests and approvals (e.g., for privacy issues) as well as reminder actions. The notification component 112 sends one or more notifications to the requesting device. A user interface enables the user to set reminders that will be displayed when the target device triggers geographical events (e.g., arrives at the point of interest). The user interface further enables the target device user to approve reminder requests from one or more requesting users (devices).

The system 300 illustrates a reminder settings UI 302 that further includes user interfaces such as a reminder creation UI 304, a reminder removal UI 306, and an actions UI 308. Other user interfaces can be designed and utilized as desired. The reminder creation UI 304 enables the user to create one or more reminders for a single geo-fence event (the target device intersecting the virtual perimeter) or multiple events entering a point of interest and then exiting the point of interest. The reminder approval UI 306 enables the user to allow geolocation identification or to not allow geolocation identification. The actions UI 308 enables the user to set and associate actions with the reminder.

The reminder actions 310 include, but are not limited to, notifying contacts 312 (send one or messages such as an SMS (short message service) message to a specified list of contacts, an email to a specified list of contacts), call a user 314 (call a specified phone number or an emergency phone number (e.g., 9-1-1)), send geo-location identifier data 316 (send specific GPS trails (geolocation information in an emergency situation)), and record sensor data 318 (e.g., audio signals such as voices in the immediate vicinity of the target device (e.g., phone) and then sending some or all of this data to a designated entity or system).

The reminder component (the reminder settings UI 302 and reminder actions 310) can be a network service (a server side application that communicates with the clients, including target and requesting devices) and enables the following additional functionalities: the target user of the target device give permission to other users (requesting users of requesting devices) to obtain the target user's location (e.g., obtain the target user's location at specific times); the requesting user can add and/or modify reminders (e.g., when the target user device is leaving a school perimeter or area); requesting users can maintain reminders from different machines (e.g., smartphones, computers, etc.); maintains a user base with privacy-related data; and provides fresh data for refreshable queries (e.g., "restaurants in Seattle").

Additionally, the actions 310 can include activating one or more sensors on the target device to capture data which can be used to measure speed of the target device. The speed can indicate if the target device is moving according to a walking speed, jogging speed, running speed, driving speed, varying speed sequences (e.g., indicate approaching the point of interest, then slowing down to park followed by walking to access the point of interest), and so on.

The system 300 also includes the notification component 112, which in this embodiment, further includes a geo-fencing engine 320, a filter confirmation component 322 and query refresh component 324. The notification component notifies the requesting device (User X) when the target device (User Y) triggered the geo-fence and/or arrived at a point of interest.

The geo-fencing engine 320 provides the capability to employ geo-fencing technology to signal when the target device (and user) reaches specified geographic locations such as a specific point of interest, enters the point of interest, exits the point of interest, and so on. The geo-fencing engine 320 notifies the requesting user when a target user has entered and/or exited one of the specified points of interest, and can store all the geo-fence data (e.g., geo-location information of the virtual fence associated with an area, geo-location of the target device, etc.).

The filter confirmation component 322 enables the creation and application of filter parameters. The parameters can include, but are not limited to, time filter (e.g., prefer the reminder only in association with a specific time), places filter (e.g., prefer one location over another location, only certain points of interest, etc.), the time and date, user speed, user heading, and/or environmental conditions (e.g., weather, road conditions, route conditions, traffic conditions, etc.).

The query refresh component 324 enables a standing query to be applicable to not only the original points of interest at the time the query was created and presented, but over time, to changes in the points of interest related to the query. In other words, original points of interest at the time the query was created can change due to the construction of new points of interest (e.g., a new shopping mall) and due to points of interest that no longer exist (e.g., police check points). The points of interest relevant to the standing query are then updated automatically (e.g., dynamically) based on the changes to an area or region of interest. This further dynamically changes the locations form which the reminder(s) will be triggered. For example, if a reminder was originally created to execute based on discovery of a shopping mall that includes Vendor X, the construction of a new shopping mall at a different location in the region of interest that includes a new location of Vendor X can also trigger a reminder (a new reminder) or the same reminder as for the original Vendor X.

In an implementation for a mobile device, a mobile operation system 326 of the mobile device can include a location subsystem 328 that facilitates determination of the geographical location of the mobile device. The operation subsystem 326 can further include an orientation and motion subsystem 330 which includes sensors (e.g., accelerometer) that facilitate the determination of speed and heading, for example, of the associated mobile device. A voice subsystem 332 can include the hardware and software for receiving and processing voice signals (e.g., speech).

It is to be understood that where user information (e.g., identifying geo-location information) may be made available to and utilized by others, the user is provided the option to opt-in or to opt-out of allowing this information to be captured and utilized. Accordingly, a security component can be provided which enables the user to opt-in and/or opt-out of identifying geo-location information as well as personal information that may have been obtained and utilized thereafter. The user can be provided with notice of the collection of information, for example, and the opportunity to provide or deny consent to do so. Consent can take several forms. Opt-in consent imposes on the user to take an affirmative action before the data is collected. Alternatively, opt-out consent imposes on the subscriber to take an affirmative action to prevent the collection of data before that data is collected. This is similar to implied consent in that by doing nothing, the user allows the data collection after having been adequately informed. The security component ensures the proper collection, storage, and access to the user information while allowing for the dynamic selection and presentation of the content, features, and/or services that assist the user to obtain the benefits of a richer user experience and to access to more relevant information.

Put another way, a notification system is provided that comprises a reminder component that includes a user interface which facilitates management of a reminder to a requesting device based on location of a target device relative to a point of interest, a permissions component that processes a request from the requesting device to access geo-location information associated with the target device and an approval from the target device to allow identification of geolocation by the requesting device, a geo-location component that identifies the geographic location of the target device relative to the point of interest based on a query, and a notification component that communicates a notification to the requesting device when the geographic location of the target device matches a virtual perimeter defined in association with the point of interest.

The query can define a single geographic point of interest or a class of points of interest, the notification is communicated when the target device matches the virtual perimeter. The notification component refreshes the query to include added points of interest associated with the virtual perimeter and removed points of interest associated with the virtual perimeter, and the reminder and notification are processed based on the refreshed query. The system can further comprise a filter component that applies a filter to information associated with the reminder, the notification is communicated to a user and/or multiple users defined in the reminder. The reminder includes reminder actions that when processed, at least one of notify contacts, call a user device, send geo-location information, or sense and record surrounding information. The notification component validates that the target device is at the point of interest based on conditions that include at least one of time, date, speed of the target device, heading of the target device, or environmental conditions.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 4:
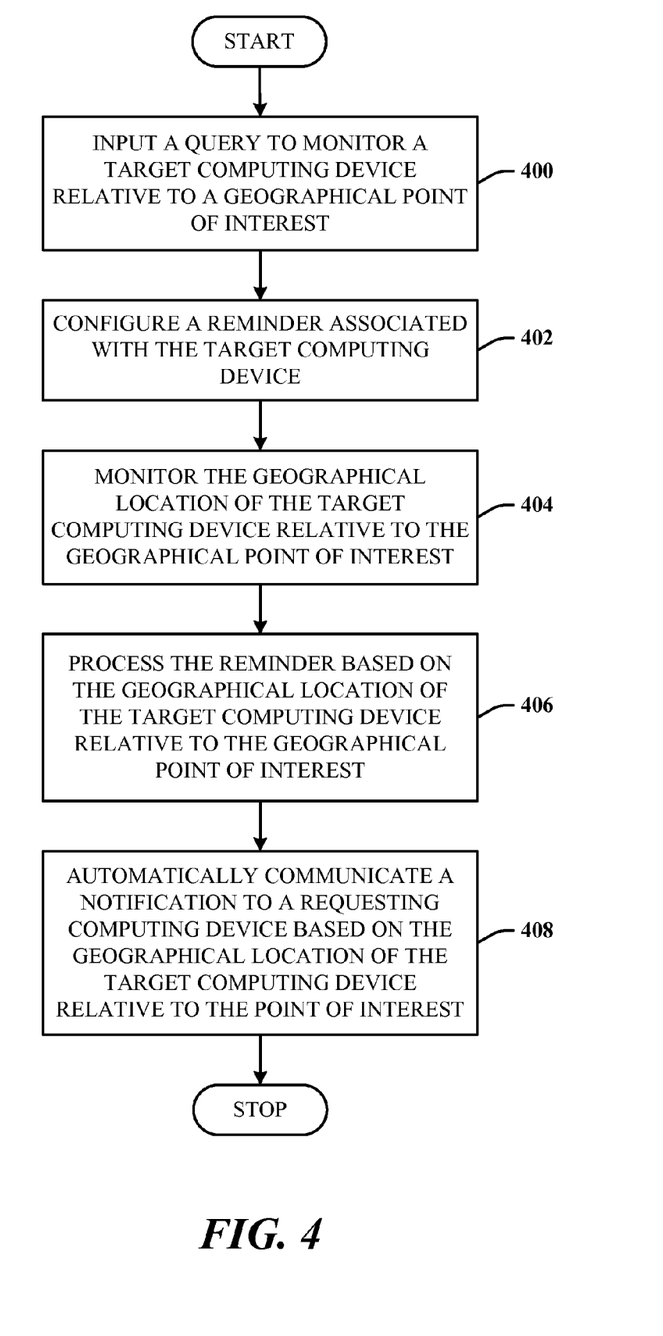
FIG. 4 illustrates a computer-implemented notification method in accordance with the disclosed architecture.

FIG. 4 illustrates a computer-implemented notification method in accordance with the disclosed architecture. At 400, a query is input to monitor a target computing device relative to a geographical point of interest. At 402, a reminder is configured to be associated with the target computing device. At 404, the geographical location of the target computing device is monitored relative to the geographical point of interest. At 406, the reminder is processed based on the geographical location of the target computing device relative to the geographical point of interest. At 408, a notification is automatically communicated to a requesting computing device based on the geographical location of the target computing device relative to the point of interest.

Figure 5:
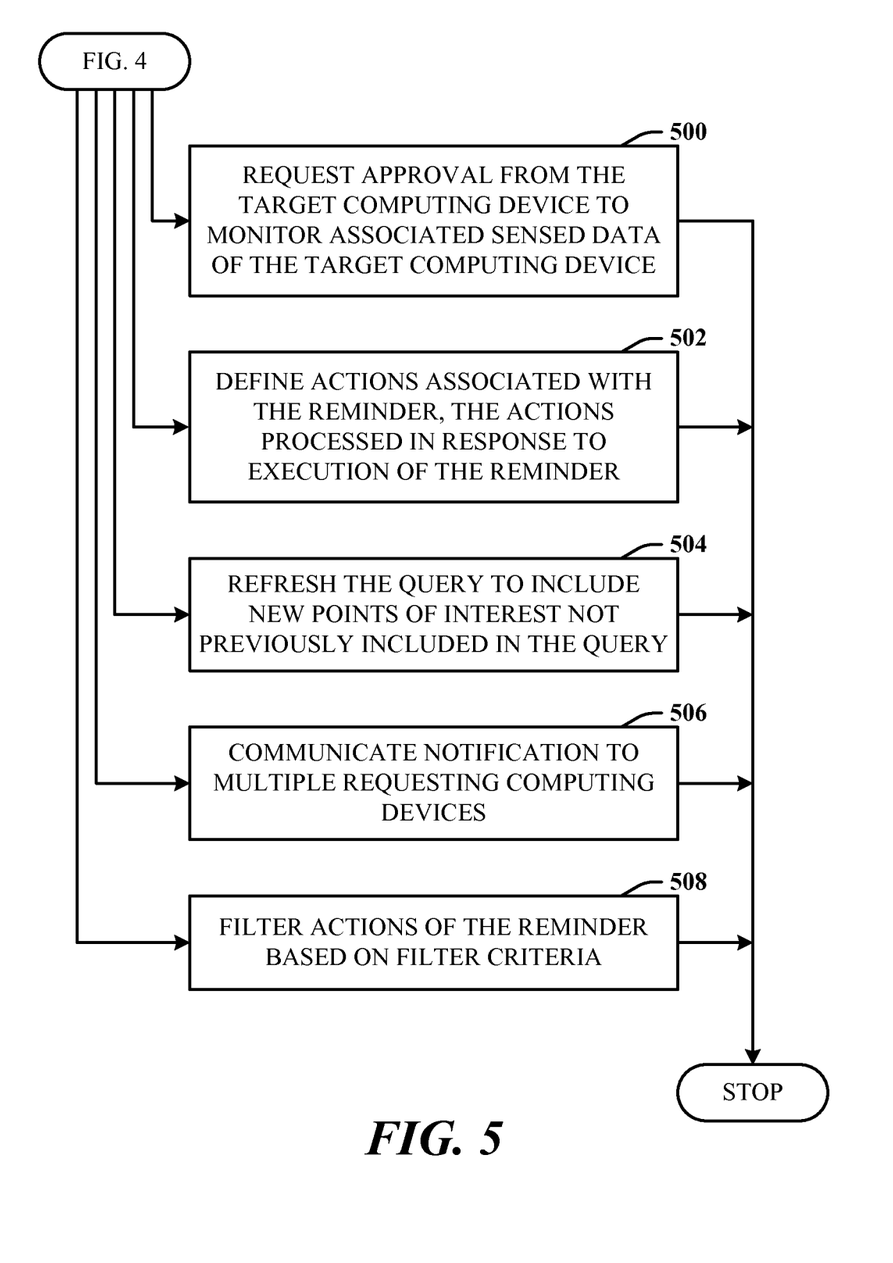
FIG. 5 illustrates further aspects of the method of FIG. 4.

FIG. 5 illustrates further aspects of the method of FIG. 4. Note that the flow indicates that each block can represent a step that can be included, separately or in combination with other blocks, as additional aspects of the method represented by the flow chart of FIG. 4. At 500, approval is requested from the target computing device to monitor associated sensed data of the target computing device. At 502, actions are defined associated with the reminder, the actions processed in response to execution of the reminder. At 504, the query is refreshed to include new points of interest not previously included in the query. At 506, the notification is communicated to multiple requesting computing devices. At 508, actions of the reminder are filtered based on filter criteria.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
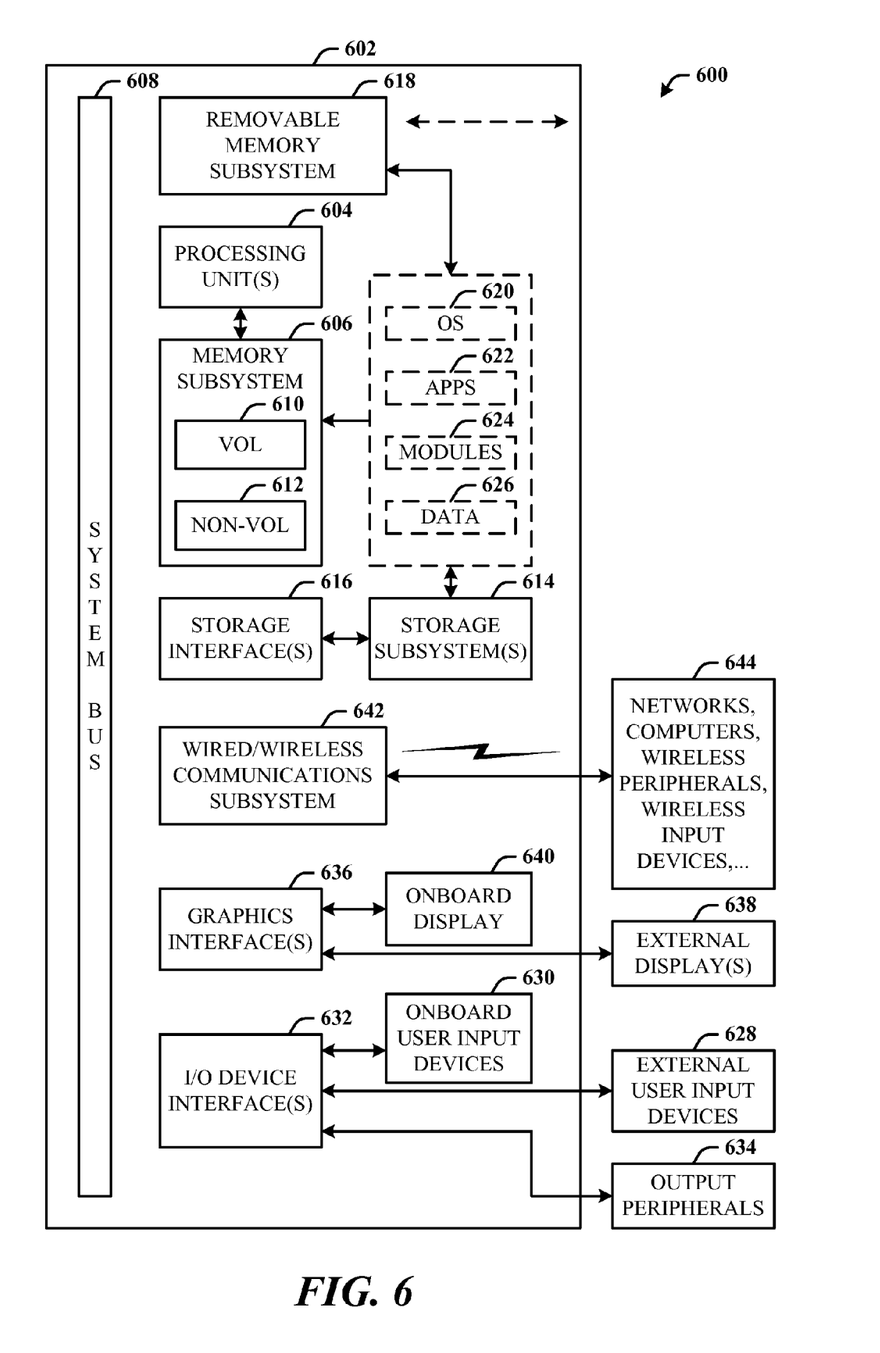
FIG. 6 illustrates a block diagram of a computing system that executes notification and reminders in accordance with the disclosed architecture.

Referring now to FIG. 6, there is illustrated a block diagram of a computing system 600 that executes notification and reminders in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having processing unit(s) 604, a computer-readable storage such as a system memory 606, and a system bus 608. The processing unit(s) 604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 606 can include computer-readable storage (physical storage media) such as a volatile (VOL) memory 610 (e.g., random access memory (RAM)) and non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the system memory 606 to the processing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components. The storage subsystem(s) 614 (physical storage media) can include one or more of a hard disk drive (HDD), a magnetic floppy disk drive (FDD), and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The operating system 620, one or more application programs 622, other program modules 624, and/or program data 626 can include entities and components of the system 100 of FIG. 1, entities and components of the system 200 of FIG. 2, the reminder component and mobile operation system 326 of system 300 of FIG. 3, and the methods represented by the flowcharts of FIGS. 4-5, for example.

Generally, programs include routines, methods, data structures, other software components, etc., that perform particular tasks or implement particular abstract data types. All or portions of the operating system 620, applications 622, modules 624, and/or data 626 can also be cached in memory such as the volatile memory 610, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 602 and includes volatile and non-volatile internal and/or external media that is removable or non-removable. For the computer 602, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 602, programs, and data using external user input devices 628 such as a keyboard and a mouse. Other external user input devices 628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 602, programs, and data using onboard user input devices 630 such as a touchpad, microphone, keyboard, etc., where the computer 602 is a portable computer, for example. These and other input devices are connected to the processing unit(s) 604 through input/output (I/O) device interface(s) 632 via the system bus 608, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 7:
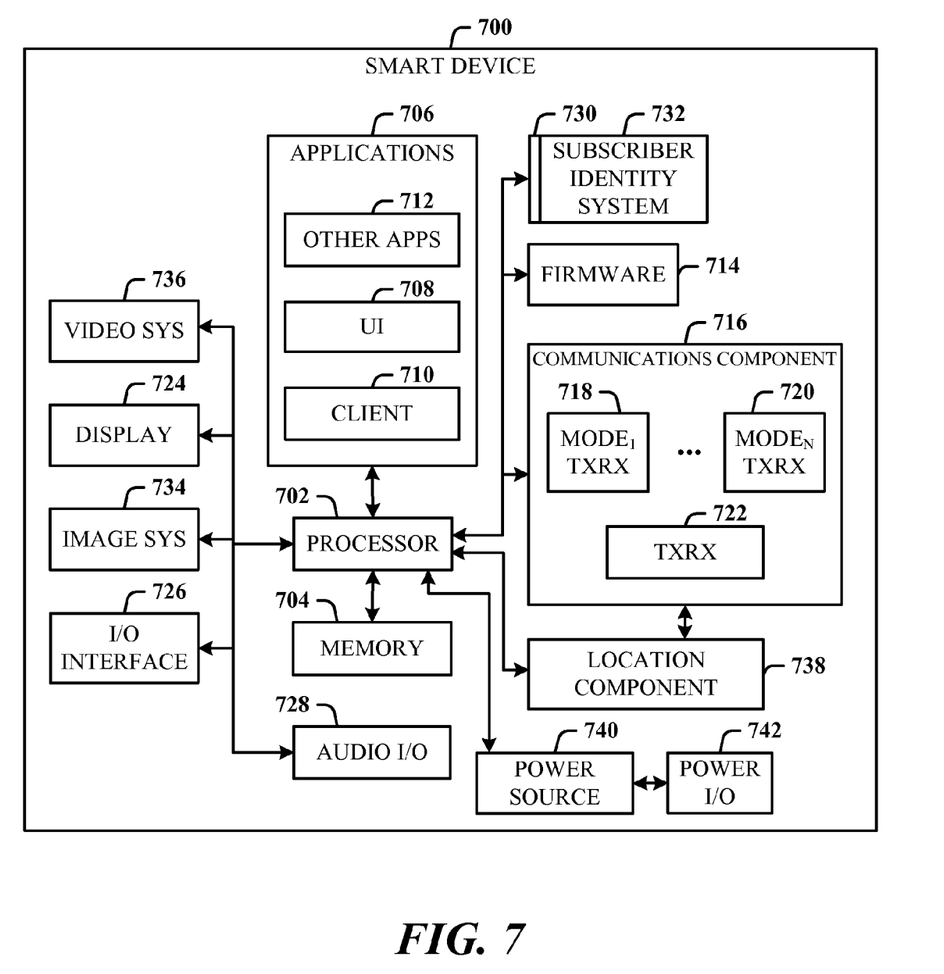
FIG. 7 illustrates a schematic block diagram of an exemplary smart mobile device that processes notification and reminders in accordance with the disclosed architecture.

FIG. 7 illustrates a schematic block diagram of an exemplary smart mobile device 700 that processes notification and reminders in accordance with the disclosed architecture. In order to provide additional context for various aspects thereof, FIG. 7 and the following discussion are intended to provide a brief, general description of a suitable environment in which the various aspects of the innovation can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

The smart device 700 (e.g., a cell phone, PDA) can typically include a variety of computer-readable media. Computer-readable media can be any available media accessed by the handset systems and includes volatile and non-volatile media, removable and non-removable media. By way of example, and not limitation, computer-readable media can comprise device storage media and communication media. Storage media includes volatile and/or non-volatile, removable and/or non-removable media implemented in any method or technology for the storage of information such as computer-readable instructions, data structures, program modules or other data. Storage media can include, but is not limited to, RAM, ROM, EEPROM, flash memory or other memory technology, CD-ROM, digital video disc (DVD) or other optical disk storage, magnetic tape, magnetic disk storage or other magnetic storage devices, or any other medium which can be used to store the desired information and which can be accessed by the mobile device systems.

The smart device 700 includes a processor 702 for controlling and processing onboard operations and functions. A memory 704 interfaces to the processor 702 for the storage of data and one or more applications 706 (e.g., a video player software, user feedback component software, etc.).

The applications 706 can include the reminder component (settings UI 302 and reminder actions 310) of the system 100 of FIG. 1, one or more of the entities and components of the system 200 of FIG. 2, the mobile operation system 326 of system 300 of FIG. 3, and methods as provided herein in FIGS. 4-5, for example. The applications also facilitate direct (e.g., wired and/or wireless) communications with the external systems.

The applications 706 can also include a user interface (UI) application 708 that operates with a client 710 (e.g., operating system) to facilitate user interaction with handset functionality and data, for example, answering/initiating calls, entering/deleting data, configuring settings, address book manipulation, multimode interaction, etc. The applications 706 can include other applications 712 that came installed with the device 700 and/or can be installed as add-ons or plug-ins to the client 710 and/or UI 708, for example, or for other purposes (e.g., processor, firmware, etc.).

The other applications 712 can include voice recognition of predetermined voice commands that facilitate user control, call voice processing, voice recording, messaging, e-mail processing, video processing, image processing, music play, as well as subsystems or components described infra. Some of the applications 706 can be stored in the memory 704 and/or in a firmware 714, and executed by the processor 702 from either or both the memory 704 or/and the firmware 714. The firmware 714 can also store code for execution in power-up initialization and control during normal operation of the smart device 700.

A communications component 716 can interface to the processor 702 to facilitate wired/wireless communications with external systems, for example, cellular networks, VoIP (voice-over-IP) networks, local wireless networks or personal wireless networks such as Wi-Fi, Wi-Max, and so on. Here, the communications component 716 can also include a multimode communications subsystem for providing cellular communications via different cellular technologies. For example, a first cellular transceiver 718 (e.g., GSM) can be one mode and an Nth transceiver 720 can provide cellular communications via an Nth cellular network (e.g., UMTS), where N is a positive integer. The communications component 716 can also include a transceiver 722 for unlicensed communications (e.g., Wi-Fi, Wi-Max, Bluetooth, etc.) for corresponding communications. The communications component 716 can also facilitate communications reception from terrestrial radio networks (e.g., broadcast), digital satellite radio networks, and Internet-based radio services networks.

The smart device 700 can process IP data traffic via the communications component 716 to accommodate IP traffic from an IP network such as, for example, the Internet, a corporate intranet, a home broadband network, a personal area network, etc., via an ISP or broadband cable provider. Thus, VoIP traffic can be utilized by the smart device 700 and IP-based multimedia content can be received in an encoded and/or decoded format.

The smart device 700 includes a display 724 for displaying multimedia that include text, images, video, telephony functions (e.g., a Caller ID function), setup functions, menus, etc. The display 724 can also accommodate the presentation of multimedia content (e.g., music metadata, messages, wallpaper, graphics, etc.).

An input/output (I/O) interface 726 can be provided for serial/parallel I/O of data and/or signals (e.g., USB, and/or IEEE 1394) via a hardwire connection, and other I/O devices (e.g., a keyboard, keypad, mouse, interface tether, stylus pen, touch screen, etc.). The I/O interface 726 can be utilized for updating and/or troubleshooting the smart device 700, for example.

Audio capabilities can be provided via an audio I/O component 728, which can include a speaker for the output of audio signals related to, for example, indication that the user pressed the proper key or key combination to initiate the user feedback signal, call signals, music, etc. The audio I/O component 728 also facilitates the input of audio signals via a microphone to record data and/or telephony voice data, and for inputting voice signals for telephone conversations.

The smart device 700 can include a slot interface 730 for accommodating a subscriber identity system 732 that can accommodate a SIM or universal SIM (USIM), and interfacing the subscriber identity system 732 with the processor 702. However, it is to be appreciated that the subscriber identity system 732 can be manufactured into the smart device 700 and updated by downloading data and software thereinto, such as the access information described herein.

An image capture and processing system 734 (e.g., a camera) can be provided for decoding encoded image content. Additionally, as indicated, photos can be obtained via an associated image capture subsystem of the image system 734. The smart device 700 can also include a video component 736 for processing video content received and, for recording and transmitting video content.

Optionally, a geolocation component 738 (e.g., GPS-global positioning system) facilitates receiving geolocation signals (e.g., from satellites via the communications component 716) that define the location of the smart device 700. Alternatively, or in combination therewith, the geolocation component 738 can facilitate triangulation processing for locating the smart device 700.

The smart device 700 also includes a power source 740 in the form of batteries and/or an AC power subsystem, which power source 740 can interface to an external power system or charging equipment (not shown) via a power I/O component 742.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented notification system, comprising:
   a reminder component that manages configuration and approval of a reminder related to a geographic location of a target device relative to a point of interest;
   a notification component that monitors the geographic location of the target device and communicates a notification to a requesting device according to the reminder when the geographic location of the target device meets qeo-location criteria related to the point of interest; and
   a processor that executes computer-executable instructions associated with at least one of the reminder component or the notification component.

2. The system of claim 1, wherein the target device is a mobile device the geographic location of which is monitored, and the requesting device is at least one of a computing device or a web server to which the notification is communicated.

3. The system of claim 1, wherein the point of interest is a single geographic location specified in association with the reminder.

4. The system of claim 1, wherein the point of interest is one of a class of locations specified in association with the reminder, and wherein the notification is communicated when the target device meets the geo-location criteria related to the point of interest for a location of the class.

5. The system of claim 1, wherein the notification component includes a geo-location component that identifies geo-location points of interest relative to a query, and refreshes the query to include added points of interest and removed points of interest associated with a geo-fence, and wherein the reminder is executed upon meeting criteria of the refreshed query.

6. The system of claim 1, wherein the reminder component includes a user interface that facilitates at least one of user creation of the reminder, user approval of the reminder from the requesting device, and user definition of an action to be executed upon meeting criteria of the reminder.

7. The system of claim 1, further comprising a filter component that applies a filter parameter to the geo-location criteria, wherein the notification is communicated to the requesting device based on the filter parameter.

8. The system of claim 1, further comprising a permissions component that processes a request by the requesting device to access geolocation information of the target device, and that provides an approval to allow identification of geolocation information of the target device by the requesting device.

9. A computer-implemented notification system, comprising:
a reminder component that includes a user interface which facilitates management of a reminder to a requesting device based on location of a target device relative to a point of interest;
a permissions component that processes a request from the requesting device to access geo-location information associated with the target device and an approval from the target device to allow identification of geo-location information associated with the target device by the requesting device;
a geo-location component that identifies the geographic location of the target device relative to the point of interest based on a query;
a notification component that communicates a notification to the requesting device according to the reminder when the geographic location of the target device meets geo-location criteria of a virtual perimeter defined in association with the point of interest; and
a processor that executes computer-executable instructions associated with at least one of the reminder component, the permissions component, the geo-location component, or the notification component.

10. The system of claim 9, wherein the query defines a single geographic point of interest or a class of points of interest, and wherein the notification is communicated when the target device meets geo-location criteria of the virtual perimeter.

11. The system of claim 9, wherein the notification component refreshes the query to include added points of interest associated with the virtual perimeter and removed points of interest associated with the virtual perimeter, and wherein the reminder is executed upon meeting criteria of the refreshed query.

12. The system of claim 9, further comprising a filter component that applies a filter to information associated with the reminder, wherein the notification is communicated to a user defined in the reminder.

13. The system of claim 9, wherein the reminder includes reminder actions comprising at least one of notifying contacts, calling a user device, sending qeo-location information, or sensing and recording sensor data in the vicinity of the target device.

14. The system of claim 9, wherein the notification component validates that the target device is at the point of interest based on conditions that include at least one of time of day, date, speed of the target device, heading of the target device, or environmental conditions.

15. A computer-implemented notification method, comprising acts of:
inputting a query to monitor a target computing device relative to a geographical point of interest;
configuring a reminder associated with the target computing device;
monitoring the geographical location of the target computing device relative to the geographical point of interest;
executing a reminder action associated with the reminder based on the geographical location of the target computing device relative to the geographical point of interest;
automatically communicating a notification to a requesting computing device based on the geographical location of the target computing device relative to the point of interest; and
utilizing a processor that executes instructions stored in memory to perform at least one of the acts of configuring, monitoring, communicating, or processing.

16. The method of claim 15, further comprising requesting approval from the target computing device to monitor associated sensed data of the target computing device.

17. The method of claim 15, further comprising defining a plurality of reminder actions associated with the reminder, and wherein the plurality of reminder actions are executed when the geographic location of the target device meets qeo-location criteria related to the point of interest.

18. The method of claim 17, further comprising filtering the plurality of reminder actions associated with the reminder based on filter criteria.

19. The method of claim 15, further comprising refreshing the query to include new points of interest not previously included in the query.

20. The method of claim 15, further comprising communicating the notification to multiple requesting computing devices.

* * * * *